(12) United States Patent
Bischoff

(10) Patent No.: US 6,494,527 B1
(45) Date of Patent: Dec. 17, 2002

(54) DISPLAY AND/OR CONTROL UNIT FOR AT LEAST ONE ELECTRICAL DEVICE IN MOTOR VEHICLES

(75) Inventor: Klaus Bischoff, Evessen (DE)

(73) Assignee: Volkswagen AG, Wolfburg/Fallersleben (DE)

( * ) Notice: Subject to any disclaimer, the term of this patent is extended or adjusted under 35 U.S.C. 154(b) by 0 days.

(21) Appl. No.: 09/616,649

(22) Filed: Jul. 14, 2000

(30) Foreign Application Priority Data

Jul. 14, 1999 (DE) .......................... 199 32 791

(51) Int. Cl.⁷ .................................................. B60J 7/00
(52) U.S. Cl. ..................... 296/208; 296/37.14; 296/24.1
(58) Field of Search ............................ 296/24.1, 37.8, 296/37.7, 37.14, 208, 190.01, 190.02, 70, 214; 454/69, 162, 166

(56) References Cited

U.S. PATENT DOCUMENTS

| | | | | |
|---|---|---|---|---|
| 4,516,777 A | * | 5/1985 | Nikora ........................ 312/7.2 |
| 4,867,498 A | * | 9/1989 | Delphia et al. ............. 296/37.7 |
| 5,249,121 A | * | 9/1993 | Baum et al. ................... 345/4 |
| 5,775,762 A | * | 7/1998 | Vitito ........................ 296/37.7 |
| 5,823,599 A | * | 10/1998 | Gray ......................... 296/37.8 |
| 5,927,784 A | * | 7/1999 | Vitito ........................ 296/37.7 |
| 6,019,411 A | * | 2/2000 | Carter et al. ................. 296/215 |
| 6,039,141 A | * | 3/2000 | Denny ............... 296/190.01 X |
| 6,086,129 A | * | 7/2000 | Gray ......................... 296/37.8 |
| 6,115,086 A | * | 9/2000 | Rosen .................. 296/37.7 X |
| 6,124,902 A | * | 9/2000 | Rosen .................. 296/37.7 X |
| 6,152,522 A | * | 11/2000 | Boulay et al. .............. 296/208 |
| 6,157,418 A | * | 12/2000 | Rosen .................. 296/37.7 X |
| 6,158,795 A | * | 12/2000 | Gray ......................... 296/37.8 |
| 6,158,802 A | * | 12/2000 | Akagi et al. ................. 296/214 |
| 6,203,088 B1 | * | 3/2001 | Fernadez et al. ........... 296/37.8 |
| 6,231,111 B1 | * | 5/2001 | Carter et al. ............... 174/68.1 |
| 6,246,449 B1 | * | 6/2001 | Rosen .................. 296/37.7 X |
| 6,315,354 B1 | * | 11/2001 | Tani et al. .................. 296/208 |

FOREIGN PATENT DOCUMENTS

| | | |
|---|---|---|
| DE | 39 27 749 | 2/1991 |
| DE | 295 18 369 | 2/1996 |
| DE | 296 08 032 | 8/1996 |

* cited by examiner

*Primary Examiner*—D. Glenn Dayoan
*Assistant Examiner*—Patricia Engle
(74) *Attorney, Agent, or Firm*—Kenyon & Kenyon

(57) ABSTRACT

A base unit for mounting on a console of a motor vehicle formed by a ventilation device and a control and/or display device. The base unit is arranged on the console so that the control and/or display device can be used by a passenger in a rear seat of a motor vehicle.

29 Claims, 3 Drawing Sheets

DISPLAY AND/OR CONTROL UNIT FOR AT LEAST ONE ELECTRICAL DEVICE IN MOTOR VEHICLES

FIELD OF THE INVENTION

The present invention relates to a basic unit having a ventilation device and a display and/or control unit for an electrical device disposed on a console of a motor vehicle.

BACKGROUND OF THE INVENTION

When setting up display and/or control units, for example so-called multi-functional control units, one not only has to consider safety aspects, but also the requirement for easy viewing and readability and straightforward and easily accessible operation.

The display and/or control units typically are mounted in or on the dashboard for the driver of the vehicle or for passengers seated in the passenger seat. However, it is often difficult for the rear passengers to see those installation positions and to manipulate the control units. For this reason, it is becoming more and more common to provide additional display and/or control units for the rear passengers.

Thus, for example, the German DE 39 27 749, incorporated by reference herein, describes providing a monitor or a video system in a recess of the center console facing the rear passengers.

In addition, video screen arrangements in the backrests of vehicle seats are known, for example, from the German DE 296 08 032. The arrangement of headrests is known, for example, from the German DE 295 18 369.

SUMMARY OF THE INVENTION

The present invention provides a display and control unit, which is able to be easily viewed and/or controlled from rear seats of a vehicle, more particularly of an automobile.

The present invention provides a display and/or control unit for at least one electrical device, in particular a comfort and convenience device in motor vehicles, equipped with at least one center console arranged between two fronts seats and includes at least one ventilation device, characterized in that the display and/or control unit and the ventilation unit form one basic unit, which is arranged on the center console.

Another embodiment of the present invention additionally arranges the basic unit on the center console in such a way so that at least the display and/or control unit is designed for passengers sitting on the rear seats of the vehicle.

Another embodiment of the present invention additionally involves the display and/or control unit as having a video screen mounted in a housing.

Another embodiment of the present invention additionally accommodates the video screen in the housing so as to be able to swivel or rotate on at least one axis.

Another embodiment of the present invention additionally provides so that the basic unit is arranged in such a way that it is able to be retracted or folded away into the center console.

Another embodiment of the present invention additionally provides that the basic unit is arranged in such a way on the center console that it is able to swivel into one or a plurality of working positions.

Another embodiment of the present invention additionally provides that the basic unit is joined via a rotatable and/or swivel-mounted joint articulation to the center console.

Another embodiment of the present invention additionally provides that the display and/or control unit and the ventilation device are interconnected via a rotational and/or swivel element.

Another embodiment of the present invention additionally provides that the basic unit is arranged so that it is able to slide on the center console in the longitudinal direction of the vehicle.

The present invention, therefore, additionally provides for combining the display and/or control unit with the ventilation unit to form one basic unit, and for arranging the basic unit on the center console. In this context, in one variant of the present invention, the basic unit is configured to be at least viewed or controlled by the rear passengers. The display and/or control unit is located in the direct range of vision or operation of the rear-seat passengers.

In accordance with one embodiment of the present invention, the display unit has a video screen, which is mounted in a housing, and is advantageously accommodated so as to be swivel-mounted on one axis or rotatable in the housing, it being possible to improve upon the readability simply by changing the position of the video screen as a function of the seat position, of the incident light, or of occurring reflections.

Moreover, the basic unit, composed of the display and/or control unit, and of the ventilation device, can be designed to be able to be retracted or folded away into the center console.

In addition, one embodiment of the present invention provides for the basic unit to be joined via a rotatable and/or swivel-mounted joint articulation to the center console, and designed to swivel by way of the joint articulation into one or a plurality of working positions. This enables the user to precisely arrange the display and control device in the desired field of view. Another specific embodiment, which makes it possible to align the display and control unit, and the ventilation device independently of one another, provides for both devices to be joined together by a rotational and/or swivel element. Both devices are able to be adjusted completely independently of one another, as desired by the user, when the basic unit is joined via the joint articulation to the center console, and when both devices are interconnected via the rotational and/or swivel element.

Additional degrees of freedom are attained in a design, in which the basic unit is able to slide on the center console in the longitudinal direction of the vehicle.

BRIEF DESCRIPTION OF THE DRAWINGS

Some embodiments of the present invention are illustrated in the following figures.

DETAILED DESCRIPTION

Figure 1:
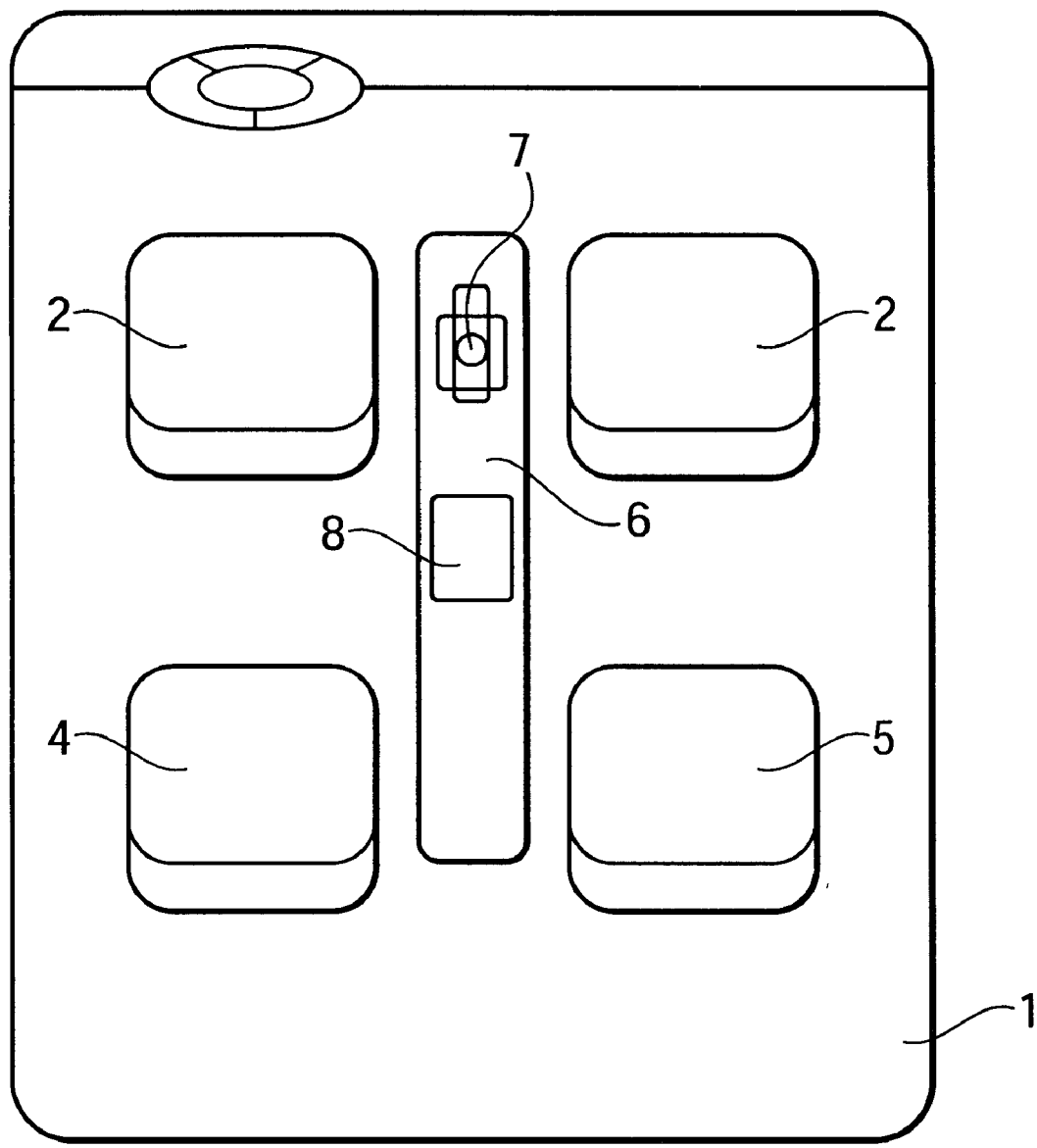
FIG. 1 shows a plan view of an embodiment of the passenger compartment of a vehicle of the present invention.

FIG. 1 illustrates the plan view of a passenger compartment 1 of a motor vehicle having two front seats 2, 3, and two rear seats 4, 5. Provided between the seats is a center console 6, on which, in addition to transmission selector lever 7, other operational control elements (not shown) can be configured, for example, for adjusting the exterior mirror of the vehicle. Likewise arranged on center console 6 is basic unit 8 composed of a display and/or control unit 9 and of a ventilation device 10. The basic unit 8 is positioned so that the ventilation device can be optimally directed toward rear seats 4 and 5, and also so that the display and/or control device can be easily viewed and manipulated by the rear passengers.

Figure 2:
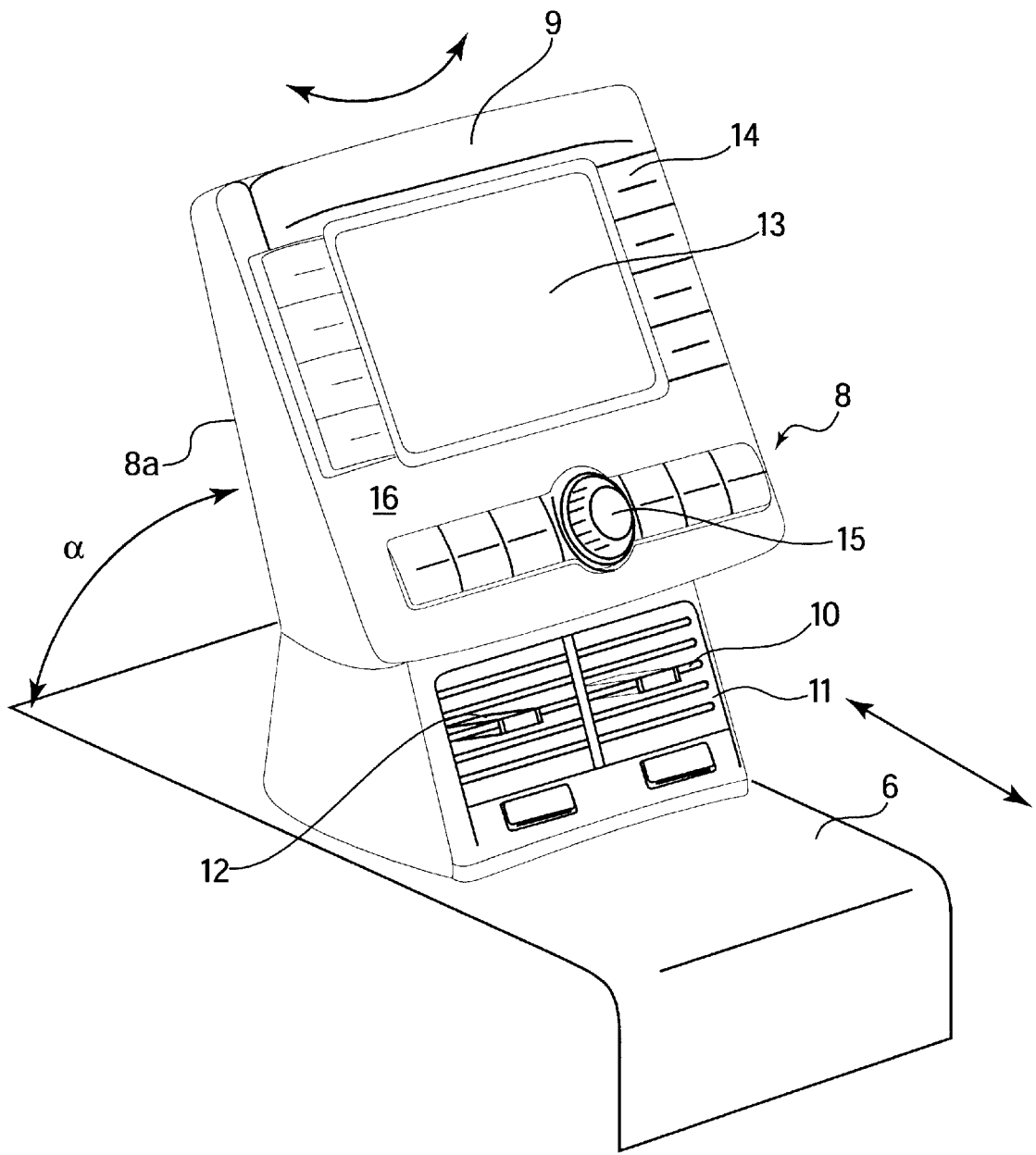
FIG. 2 shows an embodiment of the display and control unit in accordance with the present invention.

FIG. 2 shows one embodiment of basic unit 8, composed of display and/or control unit 9 and of ventilation device 10.

In this context, basic unit 8 is mounted with a slight tilt on the center console 6 so that the rear side 8a of the basic unit 8 forms an acute angle α with the top side of center console 6, making it easy for the rear passengers to view display and/or control unit 9. In this embodiment, the display and/or control unit 9 and the ventilation device 10, which has two air outlet channels or openings 11, 12, form a stationary basic unit, i.e., they are designed to neither swivel nor rotate in relation to center console 6, or in relation to one another.

Display and/or control unit 9, itself, has a video screen 13 and various control elements 14, 15. Provision can be made for video screen 13 to be swivel-mounted and/or rotationally mounted within housing 17, making it possible for the user to align the video screen 13 as desired.

Display and/or control unit 9 is a part of a multi-functional control unit, which can include, for example, an additional display and/or control unit in the dashboard. In this context, display and control unit 9 can be used to control many different electronic devices such as audio equipment, air conditioning, navigation systems, and television, through the selection of various menus and menu levels. In this embodiment, the equipment to be controlled can be selected using control elements 14 designed as momentary-contact switches. In response to the user's input, the functions subordinate to the main menus can be selected with the aid of rotary position transducer/pressure sensor 15 or of softkeys configured to the side of video screen 13.

Figure 3A:
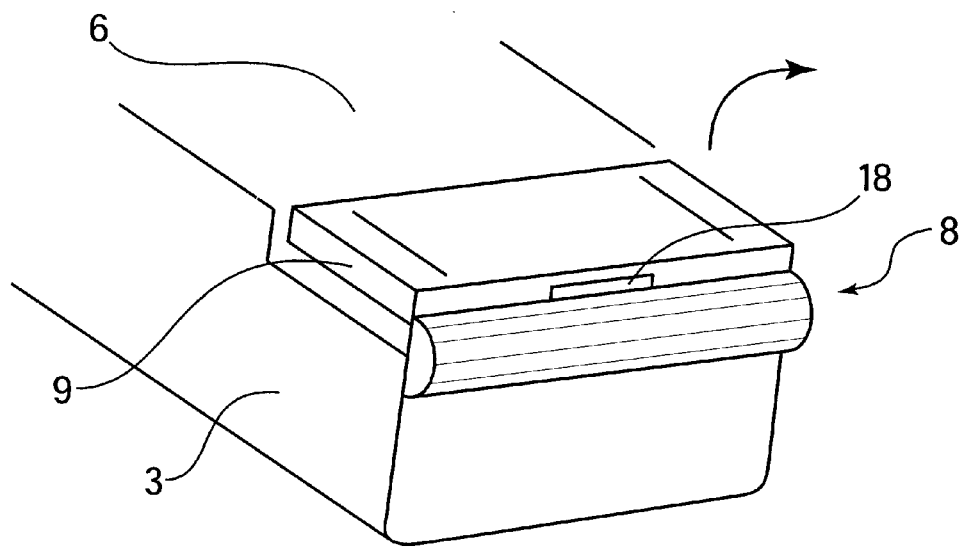
FIGS. 3a and 3b show another embodiment of the display and control unit in accordance with the present invention.
Figure 3B:
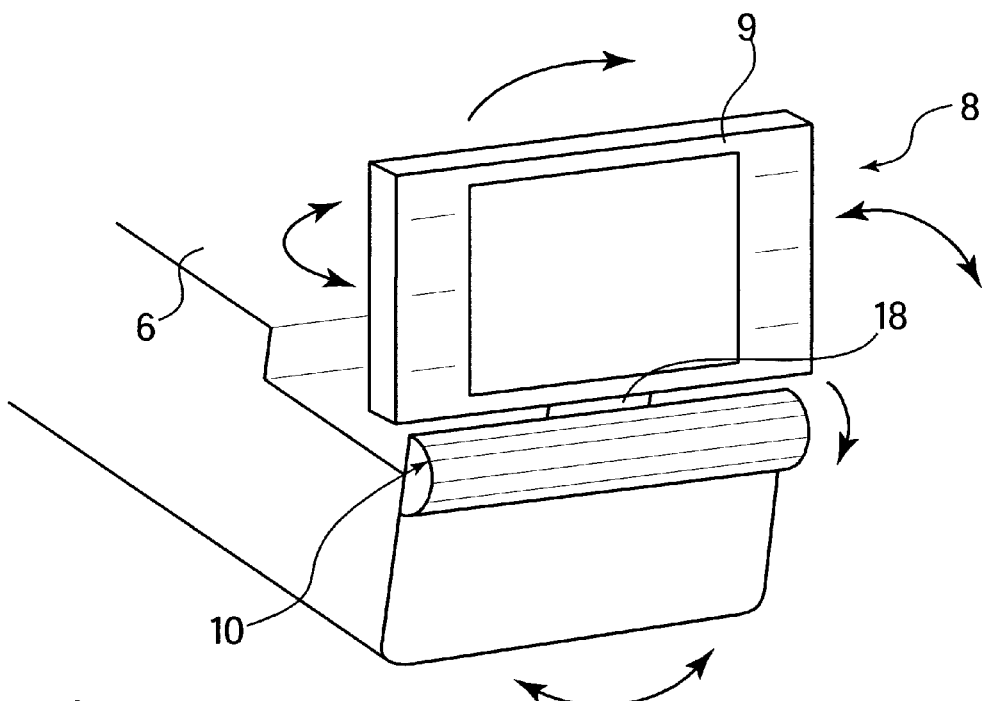

FIGS. 3a and 3b illustrate another arrangement of basic unit 8 on the center console. In this case, however, the basic unit is placed further back and the ventilation device 10 in-part or in-whole forms the base of display and control unit 9. A rotary and swivel element 18 is configured between display and control unit 9 and ventilation device 10. This enables the display and control unit 9 to be swivelled into a recess in center console 6, as shown in FIG. 3a, when it is not being used. The display and control unit 9 can also be placed in its working position, as shown in FIG. 3b. Moreover, using rotary and swivel element 18, display and control unit 9 can be tilted on its vertical axis, toward the individual users.

What is claimed is:

1. A basic unit for mounting on a floor-mounted console of a motor vehicle comprising:
  a ventilation device; and
  at least one of a control device and a display device;
  wherein the ventilation device and the at least one of a control device and display device are configured to be mounted as a single unit to the floor-mounted console.

2. The basic unit as recited in claim 1 wherein the basic unit is configured to be mounted on the console so that the at least one of a control device and a display device can be used by a passenger in a rear seat of a motor vehicle.

3. The basic unit as recited in claim 2 wherein the at least one of a control device and a display device includes a video screen mounted in a housing.

4. The basic unit as recited in claim 3 wherein the video screen is mounted in the housing so that it can rotate on at least one axis.

5. The basic unit as recited in one of claims 2, 3, or 4 wherein the basic unit is adapted so that the basic unit can be folded into the console.

6. The basic unit as recited in one of claims 2, 3, or 4 wherein the basic unit is adapted so that is can swivel on a console into a plurality of working positions.

7. The basic unit as recited in claim 5 wherein the basic unit is adapted so that the basic unit can swivel on the console into a plurality of working positions.

8. The basic unit as recited in claim 6 further comprising a rotatable mounted joint articulation, the rotatable mounted joint articulation being disposed between the basic unit and the console so that the basic unit is capable of rotating about at least one axis.

9. The basic unit as recited in claim 7 further comprising a rotatable mounted joint articulation, the rotatable mounted joint articulation being disposed between the basic unit and the console so that the basic unit is capable of rotating about at least one axis.

10. The basic unit as recited in one of claims 2, 3, or 4 further comprising an adapter connected to the at least one of a control device and a display device and to the ventilation device so that the at least one of a control device and a display device and the ventilation device are each capable of rotating about at least one axis.

11. The basic unit as recited in claim 5 further comprising an adapter connected to the at least one of a control device and a display device and to the ventilation device so that the at least one of a control device and a display device and the ventilation device are each capable of rotating about at least one axis.

12. The basic unit as recited in claim 6 further comprising an adapter connected to the at least one of a control device and a display device and to the ventilation device so that the at least one of a control device and a display device and the ventilation device are each capable of rotating about at least one axis.

13. The basic unit as recited in claim 7 further comprising an adapter connected to the at least one of a control device and a display device and to the ventilation device so that the at least one of a control device and a display device and the ventilation device are each capable of rotating about at least one axis.

14. The basic unit as recited in claim 8 further comprising an adapter connected to the at least one of a control device and a display device and to the ventilation device so that the at least one of a control device and a display device and the ventilation device are each capable of rotating about at least one axis.

15. The basic unit as recited in claim 9 further comprising an adapter connected to the at least one of a control device and a display device and to the ventilation device so that the at least one of a control device and a display device and the ventilation device are each capable of rotating about at least one axis.

16. The basic unit as recited in one of claims 2, 3, or 4 wherein the basic unit is capable of sliding on the console in a longitudinal direction of the motor vehicle.

17. The basic unit as recited in claim 5 wherein the basic unit is capable of sliding on the console in a longitudinal direction of the motor vehicle.

18. The basic unit as recited in claim 6 wherein the basic unit is capable of sliding on the console in a longitudinal direction of the motor vehicle.

19. The basic unit as recited in claim 7 wherein the basic unit is capable of sliding on the console in a longitudinal direction of the motor vehicle.

20. The basic unit as recited in claim 8 wherein the basic unit is capable of sliding on the console in a longitudinal direction of the motor vehicle.

21. The basic unit as recited in claim 9 wherein the basic unit is capable of sliding on the console in a longitudinal direction of the motor vehicle.

22. The basic unit as recited in claim 10 wherein the basic unit is capable of sliding on the console in a longitudinal direction of the motor vehicle.

23. The basic unit as recited in claim 11 wherein the basic unit is capable of sliding on the console in a longitudinal direction of the motor vehicle.

24. The basic unit as recited in claim 12 wherein the basic unit is capable of sliding on the console in a longitudinal direction of the motor vehicle.

25. The basic unit as recited in claim 13 wherein the basic unit is capable of sliding on the console in a longitudinal direction of the motor vehicle.

26. The basic unit as recited in claim 14 wherein the basic unit is capable of sliding on the console in a longitudinal direction of the motor vehicle.

27. The basic unit as recited in claim 15 wherein the basic unit is capable of sliding on the console in a longitudinal direction of the motor vehicle.

28. A console including the basic unit of claim 19.

29. A motor vehicle including the console of claim 28.

* * * * *